(12) United States Patent
Chae

(10) Patent No.: US 10,272,803 B2
(45) Date of Patent: Apr. 30, 2019

(54) SEAT RECLINER FOR VEHICLE AND METHOD FOR PRODUCING THE SAME

(71) Applicant: HYUNDAI DYMOS INCORPORATED, Seosan-si, Chungcheongnam-do (KR)

(72) Inventor: Soo Young Chae, Yongin-si (KR)

(73) Assignee: HYUNDAI DYMOS INCORPORATED, Seosan-si, Chungcheongnam-Do (KR)

( * ) Notice: Subject to any disclaimer, the term of this patent is extended or adjusted under 35 U.S.C. 154(b) by 258 days.

(21) Appl. No.: 15/354,721

(22) Filed: Nov. 17, 2016

(65) Prior Publication Data
US 2017/0144570 A1 May 25, 2017

(30) Foreign Application Priority Data
Nov. 19, 2015 (KR) .......................... 10-2015-0162515

(51) Int. Cl.
*B60N 2/235* (2006.01)
(52) U.S. Cl.
CPC .................................. *B60N 2/236* (2015.04)
(58) Field of Classification Search
CPC ...................................................... B60N 2/236
See application file for complete search history.

(56) References Cited

U.S. PATENT DOCUMENTS

| 5,611,599 | A |   | 3/1997  | Baloche et al. |           |
|-----------|---|---|---------|----------------|-----------|
| 5,820,219 | A | * | 10/1998 | Rohee          | B60N 2/236 |
|           |   |   |         |                | 297/367 R |
| 5,984,413 | A | * | 11/1999 | Baloche        | B60N 2/2358 |
|           |   |   |         |                | 297/367 R |
| 6,095,608 | A | * | 8/2000  | Ganot          | B60N 2/2358 |
|           |   |   |         |                | 297/367 R |
| 7,380,882 | B2| * | 6/2008  | Oki            | B60N 2/236 |
|           |   |   |         |                | 297/362   |

FOREIGN PATENT DOCUMENTS

| KR | 10-2014-0001651 A | 1/2014 |
| KR | 10-1422419 B1     | 7/2014 |
| KR | 10-1428942 B1     | 8/2014 |

\* cited by examiner

*Primary Examiner* — David R Dunn
*Assistant Examiner* — Tania Abraham
(74) *Attorney, Agent, or Firm* — Brinks Gilson & Lione

(57) ABSTRACT

The present disclosure provides a seat recliner for a vehicle. The seat recliner includes: a lower plate; a rotary flange that has a ring shape, is fitted around the lower plate to relatively rotate to the lower plate, and has inner teeth around the inner side of the rotary flange; locking gears that are disposed on the top of the lower plate, have outer teeth at an end, and engage with inner teeth of the rotary flange when moving forward; locking guides that are disposed between the locking gears and guide the locking gears moving forward and backward; and an upper plate that covers the locking gears and the locking guides, rotates relative to the rotary flange. In particular, a bottom of the locking guides is fixed to the top of the lower plate, and a bottom of the upper plate is fixed to the top of the locking guides.

12 Claims, 3 Drawing Sheets

SEAT RECLINER FOR VEHICLE AND METHOD FOR PRODUCING THE SAME

CROSS-REFERENCE TO RELATED APPLICATION

This application claims the priority to and the benefit of Korean Patent Application No. 10-2015-0162515, filed on Nov. 19, 2015, which is incorporated herein by reference in its entirety.

FIELD

The present disclosure relates to a seat recliner for a vehicle and a method for producing the same.

BACKGROUND

The statements in this section merely provide background information related to the present disclosure and may not constitute prior art.

Seats in transportation such as a vehicle include a seatback for supporting the back of a passenger, a seat cushion for supporting the lower body including the buttocks and thighs, and a head rest for supporting the back of the passenger's head, in which a recliner allowing for controlling an angle of the seatback with respect to the seat cushion is disposed at the joint of the seatback and the seat cushion.

In the recliners, there are a manual type in which a passenger adjusts the angle of a seatback using a lever and a power type in which a recliner is automatically operated by power from a motor that is operated by a switch. However, all recliners are desired to keep their parts strongly combined when they are operated regardless of the types to make passengers comfortable and secure safety against a collision.

That is, recliners include a part combined with a seatback and a part combined with a seat cushion, and these parts have to be firmly combined even when the recliners are operated. If they are not firmly combined, the seatback is easily changed in angle even by small shock, in which as the angle of the seatback is easily changed in a collision, so a passenger is injured.

As it is addressed to reduce the weight of a recliner that is a core part of a seat with the tendency of reducing the weight of a vehicle to improve the fuel efficiency, studies have been conducted to reduce the diameter and thickness of recliners.

We have discovered that when the diameter of a recliner is reduced, the diameter of the pitch circle of a rim gear that is one of important factors for the quality is also reduced. It adversely affects on the quality and strength. In addition, a method and a structure for clamping a lower part that is connected to the cushion frame of a seat and an upper part that is connected to a back frame have been developed, but it is desired to form many parts and thus manufacturing is difficult.

The description provided above as a related art of the present disclosure is just for helping understanding the background of the present disclosure and should not be construed as being included in the related art known by those skilled in the art.

SUMMARY

The present disclosure addresses these problems and provides a seat recliner for a vehicle that has a large thickness, has a small number of parts, has a high internal strength, and reduces a gap of a locking gear, and a method for producing the same.

In one form of the present disclosure, a seat recliner for a vehicle includes: a lower plate; a rotary flange that has a ring shape, is fitted around the lower plate and configured to rotate relative to the lower plate, the rotary flange having inner teeth around an inner side of the rotary flange; a plurality of locking gears that is disposed on a top of the lower plate, has outer teeth at an end, where the plurality of locking gears is configured to engage with the inner teeth of the rotary flange when moving forward; a plurality of locking guides that is disposed between the locking gears, and configured to guide the locking gears moving forward and backward, the locking guides having a bottom fixed to the top of the lower plate; and an upper plate configured to cover the locking gears and the locking guides, and configured to rotate relative to the rotary flange. In particular, the upper plate has a bottom fixed to tops of the locking guides.

The lower plate may have a lower flange bending upward from an outer edge of the lower plate, and the rotary flange may have an edge corresponding to the lower flange to relatively rotate in contact with the lower flange.

The lower flange may include a first vertical portion bending upward at the outer edge of the lower plate and a first horizontal portion bending outward from an end of the first vertical portion.

The rotary flange may have: a gear portion, which has a lower end being in contact with the top of the lower flange, has an outer side being in contact with the inner side of the first vertical portion, and has inner teeth on the inner side; a second horizontal portion vending outward from the end of the gear portion and having a lower end being in contact with an upper end of the first horizontal portion; and a second vertical portion bending upward at an end of the second horizontal portion.

An outer diameter of the first horizontal portion may be the same as an outer diameter of the second vertical portion.

The upper plate may have an outer diameter the same as an inner diameter of the second vertical portion of the rotary flange to be inserted in a space defined by the inner side of the second vertical portion.

The top of the upper plate may be formed at the same height as the top of the second vertical portion of the rotary flange to flush with the top surface of the second vertical portion of the rotary flange.

The bottom and the top of the locking guide may be fixed to the lower plate and the upper plate, respectively, by welding.

The locking guides may be fixed to the lower plate by its side being in contact with a side of the locking gears.

The locking guide may be fixed to the lower plate by the outer teeth of the locking gear engaged with the inner teeth of the rotary flange.

A method for producing a seat recliner of the present disclosure includes: disposing a rotary flange and a plurality of locking gears and a plurality of locking guides on a top of a lower plate; adjusting the plurality of locking gears such that sides of the locking gears of the plurality of locking gears are brought in contact with sides of the locking guides of the plurality of locking guides; fixing bottoms of the locking guides of the plurality of locking guides and the top of the lower plate to each other; disposing an upper plate; and fixing a bottom of the upper plate and tops of the locking guides of the plurality of locking guides to each other.

Another method for producing a seat recliner of the present disclosure includes: disposing a rotary flange and a plurality of locking gears and a plurality of locking guides on a top of a lower plate; adjusting the plurality of locking gears such that outer teeth of the locking gears of the plurality of locking gears are engaged with inner teeth of a rotary flange; fixing bottoms of the locking guides of the plurality of locking guides and the top of the lower plate to each other; disposing an upper plate; and fixing the bottom of the upper plate and the tops of the locking guides of the plurality of locking guides to each other.

According to a seat recliner for a vehicle and a method for producing the seat recliner of the present disclosure, it is possible to remarkably reduce thickness, reduce the number of parts, increase internal strength of the recliner, and reduces a gap of locking gears.

Only the thickness of two plates and locking gears therebetween is desired for the recliner, so the thickness is remarkably reduced as compared with recliners of the related art.

Further, since the locking guide portion has a both end-supporting structure, strength of the recliner is increase, and additional parts such as a retainer are removed, so the weight and the manufacturing cost are reduced.

In particular, it is possible to reduce a gap between a locking gear and a locking guide by finely adjusting the position of the locking guide in an assembly process, so there is no need for a gap-removing unit for the recliner.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

In order that the disclosure may be well understood, there will now be described various forms thereof, given by way of example, reference being made to the accompanying drawings, in which:

A seat recliner for a vehicle according to one form of the present disclosure and a method for producing the seat recliner are described hereafter with reference to the accompanying drawings.

Figure 1:
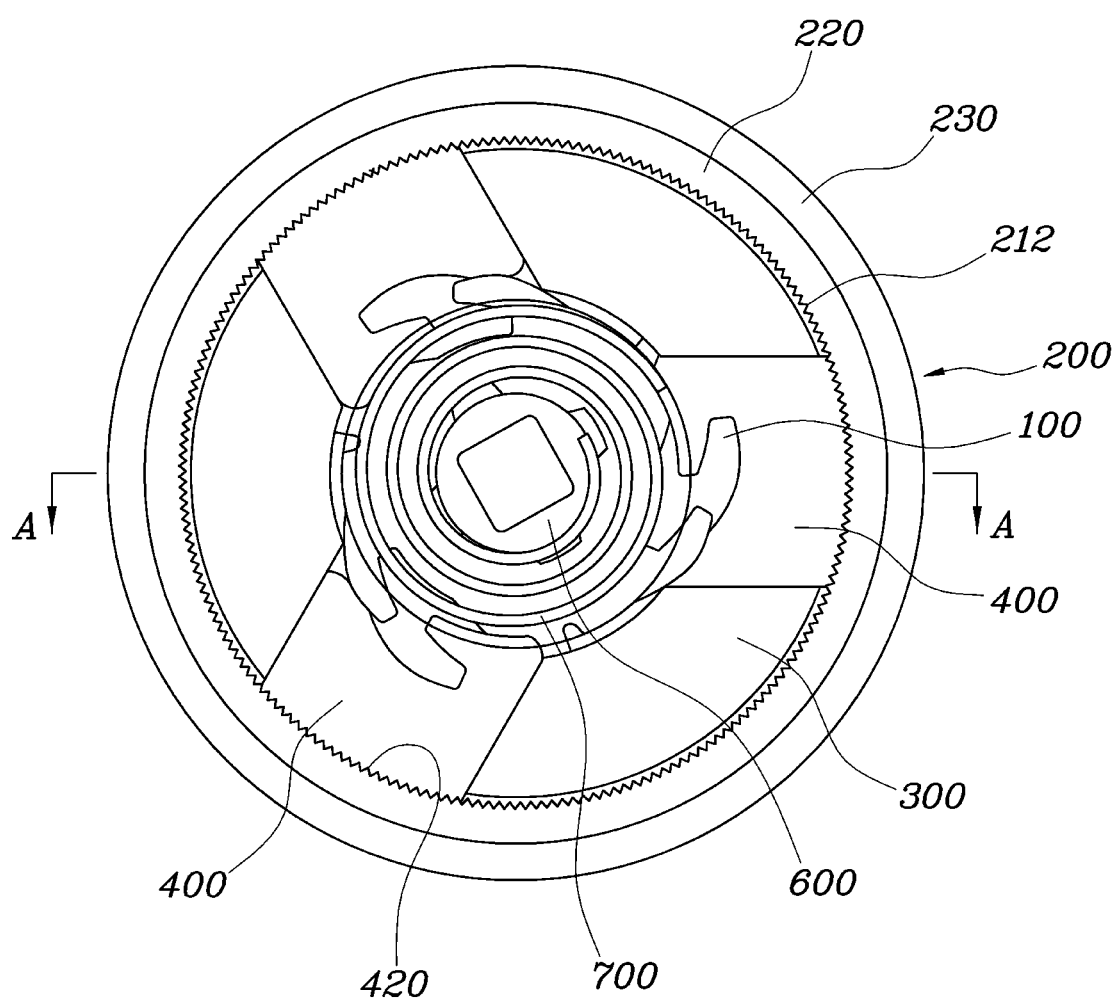
FIG. 1 is a diagram showing the inside of a seat recliner for a vehicle.
Figure 2:
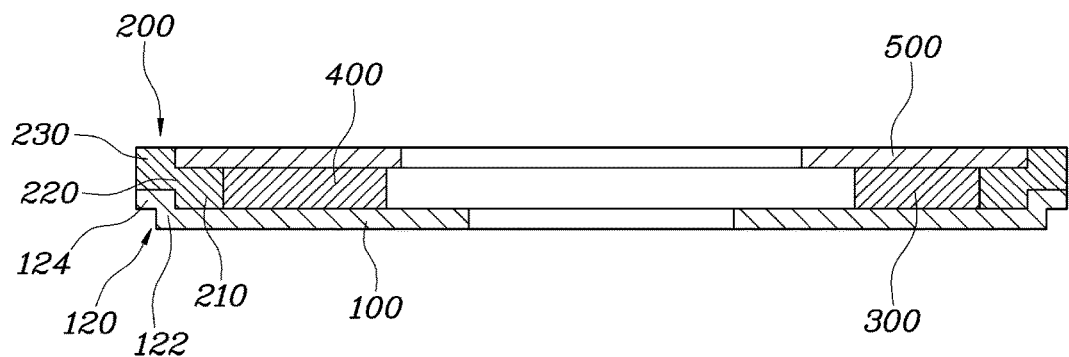
FIG. 2 is a cross-sectional view of the seat recliner for a vehicle shown in FIG. 1, taken along line A-A.
Figure 3:
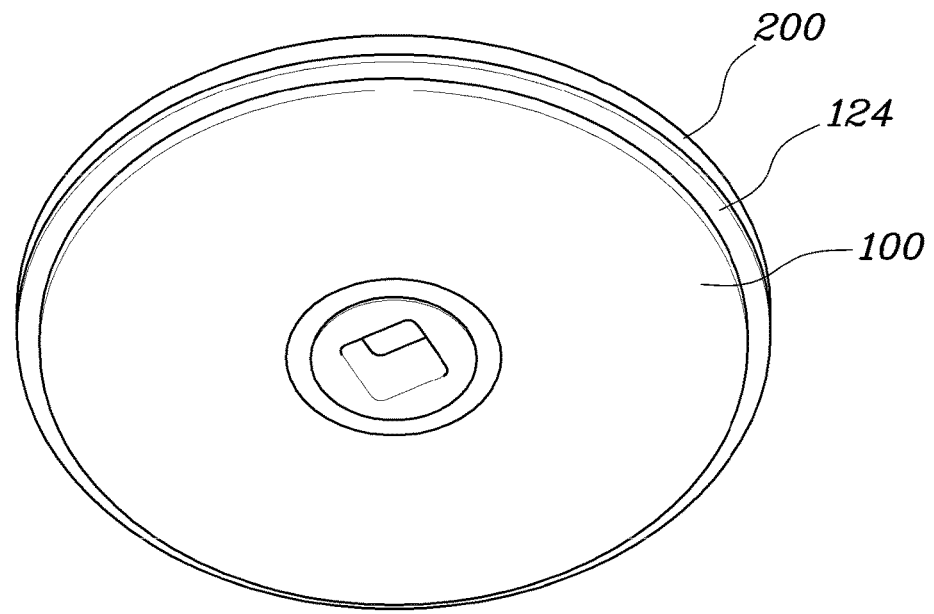
FIG. 3 is a view of the seat recliner for a vehicle shown FIG. 1 when seen from under the seat recliner.
Figure 4:
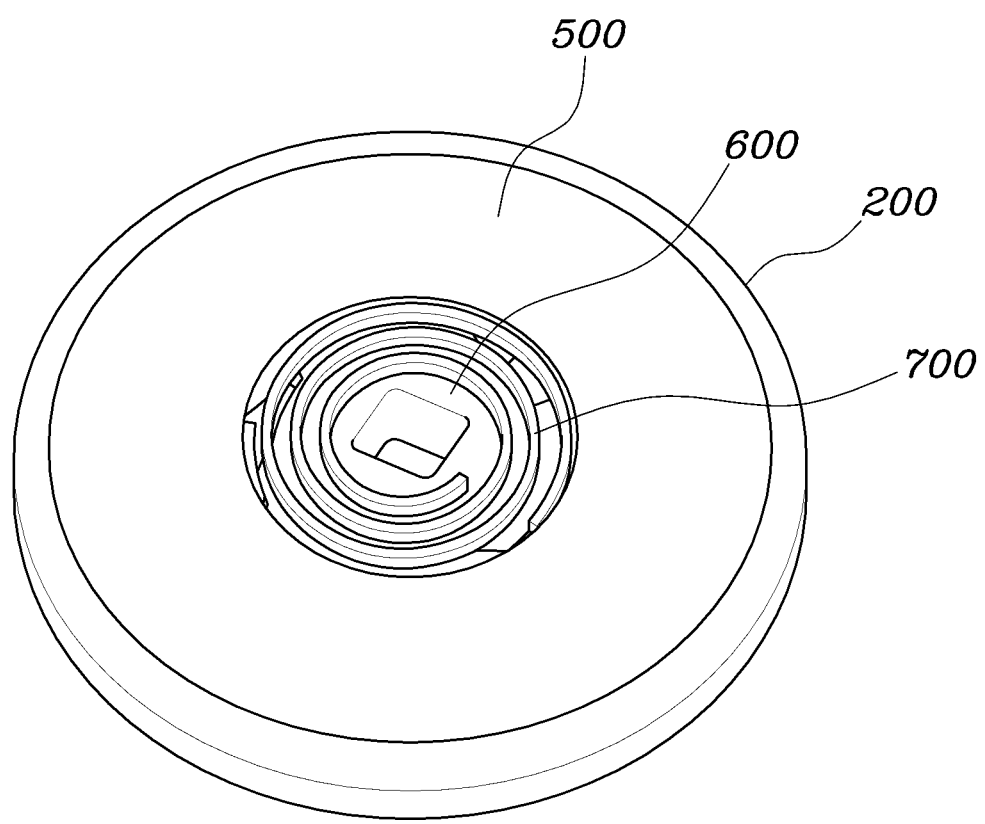
FIG. 4 is a view of the seat recliner for a vehicle shown FIG. 1 when seen from above.

FIG. 1 is a diagram showing the inside of a seat recliner for a vehicle according to one form of the present disclosure; FIG. 2 is a cross-sectional view of the seat recliner for a vehicle shown in FIG. 1, taken along line A-A; FIG. 3 is a view of the seat recliner for a vehicle shown FIG. 1 when seen from under the seat recliner; and FIG. 4 is a view of the seat recliner for a vehicle shown FIG. 1 when seen from above.

A recliner of the present disclosure is not provided with a device for clamping (retaining) at the outside a lower plate 100 that is connected to the cushion frame of a seat and an upper plate 500 that is connected to a back frame, but the corresponding function is made inside the recliner.

The lower plate that is connected to a cushion frame is generally formed by fine blanking and a locking guide that guides a locking gear is formed on the lower plate. With this arrangement, in the related art, a cantilever-like support structure supports the locking guide.

In forms of the present disclosure, a locking guide 300 is separately formed, and then the lower plate 100, the locking guide 300, the upper plate 500 are sequentially welded, whereby both ends of the locking guide 300 are supported, and thus the strength of the recliner is increased.

Further, the cover of an upper plate that is connected to a back frame in the related art is removed, so it is possible to greatly reduce the thickness and the weight.

In particular, when the locking guide 300 is welded, a locking gear 400 is first placed on the lower plate, the locking gear 400 is pushed to the locking guide 300 at both sides, and then the locking guide 300 is welded to the lower plate 100, whereby it is possible to preclude a gap that may be generated in the assembly process.

In detail,. According to recliners in the related art, one of a lower plate and an upper plate rotates relatively to the other one, so one of them is coupled to a seat cushion and the other one is coupled to a seatback. Accordingly, both of the plates require a cover to be coupled to a frame.

However, in forms of the present disclosure, the seat recliner includes: a lower plate 100 and an upper plate 500. The lower plate 100 and the upper plate 500 are fixed such that they cannot rotate relative to each other, but a rotary flange 200 disposed between them relatively rotate, so there is no need for a cover and a retainer.

In detail, the rotary flange 200 has a ring shape, is fitted around the lower plate 100 to relatively rotate, and has inner teeth 212 around the inner side. Accordingly, reclining is performed with only one of the lower plate 100 and the upper plate 500 fixed to a seat cushion and the rotary flange 200 fixed to a seatback.

Meanwhile, the locking gear 400 is disposed on the top of the lower plate 100, has outer teeth 420 at an end. There is provided a plurality of locking gears 400 spaced apart from each other so that they are locked by engaging with the inner teeth 212 of the rotary flange when moving forward, but are disengaged for reclining when moving backward.

Further, the locking guide 300 is disposed between the locking gears 400 to guide the locking gears 400 moving forward and backward, and has a bottom fixed to the top of the lower plate 100. In particular, the locking guide 300 is not integrally formed with the lower plate. Instead, it is separately formed and then welded, so it is possible to reduce the manufacturing time and cost because there is no need for a process of integrally forming a complicated structure. In particular, the position of the locking guide 300 can be finely controlled when it is assembled, so it is possible to inhibit or prevent a manufacturing tolerance such as a gap from the locking gear 400, which is an epoch-making plan.

Further, the upper plate 500 covers the locking gears 400 and the locking guides 300, and is disposed to rotate relative to the rotary flange 200 with the bottom fixed to the tops of the locking guides 300. That is, the relative positions of the lower plate 100 and the upper plate 500 are fixed with the locking guides 300 therebetween, so they cannot rotate relative to each other, but the rotary flange 200 rotates, which is a new structure.

Meanwhile, as shown in FIG. 2, the lower plate 100 has a lower flange 120 bending upward around the outer edge, and the rotary flange 200 has an edge corresponding to the lower flange 120 to relatively rotate in contact with the lower flange 120. As in FIG. 1, a shaft 600 is disposed inside the lower plate 100 to receive elastic torque from the spring 700 and the locking gears 400 engages with the locking guides 300 by sliding forward therebetween, thereby locking is made. After engaging, the rotary flange 200 cannot rotate any more, so the seatback is maintained at the angle.

In detail, the lower flange 120 may include a first vertical portion 122 bending upward at the outer edge of the lower plate 100, and a first horizontal portion 124 bending outward from the end of the first vertical portion 122. The rotary flange 200 may include a gear portion 210, which has a lower end being in contact with the top of the lower flange 120, has an outer side being in contact with the inner side of the first vertical portion 122, and has inner teeth 212 on the inner side, a second horizontal portion 220 vending outward from the end of the gear portion 210 and having a lower end being in contact with the upper end of the first horizontal portion 124, and a second vertical portion 230 bending upward at the end of the second horizontal portion 220.

In this configuration, the rotary flange 200 can easily rotate in both direction stably on the lower plate 100 with the center maintained. Further, even if pressure is applied in any one direction, the gear portion 210 of the rotary flange 200 is supported and maintained at the position by the first vertical portion 122 at a side and the entire thickness is reduced in a very compact level by the inner teeth 212 on the inner side of the gear portion 210.

Further, the outer diameter of the first horizontal portion 124 is the same as the outer diameter of the second vertical portion 230 so that a gap is inhibited or prevented therebetween parts, whereby the parts can be simply mounted on a seat frame and the mounted state can be stably maintained.

On the other hand, the upper plate 500 has an outer diameter the same as the inner diameter of the second vertical portion 230 of the rotary flange 200 to be inserted in the space defined by the inner side of the second vertical portion 230. Further, the top of the upper plate 500 is formed at the same height as the top of the second vertical portion 230 of the rotary flange 200 to make a virtual plan at the same level as the second vertical portion of the rotary flange 200 (e.g., arranging the top of the upper plate to flush with the top surface of the second vertical portion). Accordingly, the upper plate 500 can be machined in a simple plan, the manufacturing and assembling are simple, and the entire thickness can be reduced. Further, there is no locking portion that protrudes outward, so it can be easily fixed to a seat frame.

Meanwhile, the bottom and the top of the locking guide 300 are fixed to the lower plate 100 and the upper plate 500, respectively, by welding. In detail, the locking guide 300 is fixed to the lower plate with the side being in contact with the side of the locking gear 400, so a gap due to a manufacturing tolerance can be removed. That is, even if the locking guide 300 and the locking gear 400 are manufactured without a gap therebetween, a gap is caused due to a manufacturing error in most cases, in which locking is unstable. A specific gap-removing unit is generally set to remove a gap in the related art, but it is possible to finely adjust the position of the locking guide 300 in the assembly process in the present disclosure, so it is possible to preclude a gap in the assembly process.

Meanwhile, in some cases, it is possible to remove a gap by fixing the locking guide 300 to the lower plate 100 with the outer teeth 420 of the locking gear 400 engaged with the inner teeth 212 of the rotary flange 200.

On the other hand, a method for producing a seat recliner of the present disclosure includes: disposing a rotary flange and a plurality of locking gears and locking guides on the top of a lower plate; adjusting the locking gears such that the sides of the locking gears are brought in contact with the sides of the locking guides; fixing the bottoms of the locking guides and the top of the lower plate to each other; disposing an upper plate; and fixing the bottom of the upper plate and the tops of the locking guides to each other.

Meanwhile, the manufacturing method is not limited to this order. If desired, the fixing of the locking guides and the lower plate and the fixing of the upper plate and the locking guides may be simultaneously performed after the disposing of the upper plate. A gap may be removed in the same way even in this case.

In another form, a method for producing a seat recliner includes: disposing a rotary flange and a plurality of locking gears and locking guides on the top of a lower plate; adjusting the locking gears such that outer teeth of the locking gears are engaged with inner teeth of a rotary flange; fixing the bottoms of the locking guides and the top of the lower plate to each other; disposing an upper plate; and fixing the bottom of the upper plate and the tops of the locking guides to each other.

According to a seat recliner for a vehicle and a method for producing the seat recliner, it is possible to remarkably reduce thickness, reduce the number of parts, increase internal strength of the recliner, and reduces a gap of locking gears.

Only the thickness of two plates and locking gears therebetween is desired for the recliner of the present disclosure, so the thickness is remarkably reduced as compared with recliners of the related art.

Further, since the locking guide portion has a both end-supporting structure, strength of the recliner is increase, and additional parts such as a retainer are removed, so the weight and the manufacturing cost are reduced.

In particular, it is possible to reduce a gap between a locking gear and a locking guide by finely adjusting the position of the locking guide in an assembly process, so there is no need for a gap-removing unit for the recliner.

Although the present disclosure was described with reference to specific forms shown in the drawings, it is apparent to those skilled in the art that the present disclosure may be changed and modified in various ways without departing from the scope of the present disclosure.

What is claimed is:

1. A seat recliner for a vehicle, comprising:
    a lower plate;
    a rotary flange that has a ring shape, is fitted around the lower plate and configured to rotate relative to the lower plate, the rotary flange having inner teeth around an inner side of the rotary flange;
    a plurality of locking gears that is disposed on a top of the lower plate and has outer teeth at an end, where the plurality of locking gears is configured to engage with the inner teeth of the rotary flange;
    a plurality of locking guides that is disposed between the locking gears, and configured to guide a movement of the locking gears, the locking guides having a bottom fixed to the top of the lower plate; and an upper plate configured to cover the locking gears and the locking guides, and configured to rotate relative to the rotary flange, the upper plate having a bottom fixed to tops of the locking guides.

2. The seat recliner of claim 1, wherein the lower plate has a lower flange bending upward from an outer edge of the lower plate, and the rotary flange has an edge corresponding to the lower flange to relatively rotate in contact with the lower flange.

3. The seat recliner of claim 2, wherein the lower flange comprises a first vertical portion bending upward at the outer edge of the lower plate, and a first horizontal portion bending outward from an end of the first vertical portion.

4. The seat recliner of claim 3, wherein the rotary flange includes: a gear portion, which has a lower end being in contact with the top of the lower flange, has an outer side being in contact with an inner side of the first vertical portion, and has inner teeth on the inner side; a second horizontal portion vending outward from the end of the gear portion and having a lower end being in contact with an upper end of the first horizontal portion; and a second vertical portion bending upward at an end of the second horizontal portion.

5. The seat recliner of claim 4, wherein an outer diameter of the first horizontal portion is same as an outer diameter of the second vertical portion.

6. The seat recliner of claim 4, wherein the upper plate has an outer diameter same as an inner diameter of the second vertical portion of the rotary flange to be inserted in a space defined by an inner side of the second vertical portion.

7. The seat recliner of claim 6, wherein a top of the upper plate is formed at a same height as a top of the second vertical portion of the rotary flange to flush with a top surface of the second vertical portion of the rotary flange.

8. The seat recliner of claim 1, wherein the bottom and the top of the locking guides are fixed to the lower plate and the upper plate, respectively, by welding.

9. The seat recliner of claim 1, wherein the locking guides are fixed to the lower plate by a side thereof being in contact with a side of the locking gears.

10. The seat recliner of claim 1, wherein the locking guides are fixed to the lower plate by the outer teeth of the locking gears engaged with the inner teeth of the rotary flange.

11. A method for producing a seat recliner for a vehicle, the method comprising:
 disposing a rotary flange and a plurality of locking gears and a plurality of locking guides on a top of a lower plate;
 adjusting the plurality of locking gears such that sides of the locking gears of the plurality of locking gears are brought in contact with sides of the locking guides of the plurality of locking guides;
 fixing bottoms of the locking guides of the plurality of locking guides and the top of the lower plate to each other;
 disposing an upper plate; and
 fixing a bottom of the upper plate and tops of the locking guides of the plurality of locking guides to each other.

12. A method for producing a seat recliner for a vehicle, the method comprising:
 disposing a rotary flange and a plurality of locking gears and a plurality of locking guides on a top of a lower plate;
 adjusting the plurality of locking gears such that outer teeth of the locking gears of the plurality of locking gears are engaged with inner teeth of a rotary flange;
 fixing bottoms of the locking guides of the plurality of locking guides and the top of the lower plate to each other;
 disposing an upper plate; and
 fixing the bottom of the upper plate and tops of the locking guides of the plurality of locking guides to each other.

* * * * *